Oct. 25, 1955     F. J. TURCOTTE     2,721,659
MAGNETIC FUEL STRAINER
Filed June 27, 1951

Inventor
Fred J. Turcotte
By Willits, Helwig & Baillio
Attorneys

United States Patent Office 2,721,659
Patented Oct. 25, 1955

2,721,659

MAGNETIC FUEL STRAINER

Fred J. Turcotte, Flint, Mich., assignor to General Motors Corporation, Detroit, Mich., a corporation of Delaware Application June 27, 1951, Serial No. 233,820

2 Claims. (Cl. 210—1.5)

This invention relates to an improved filter and more particularly to an improved combination filter and magnetic separator.

The service requirements for automotive gasoline strainers or filters have become very critical due to recent carburetor developments. The new high efficiency and high performance carburetors have extremely fine jets which require the fuel to be more prefectly strained. Thus finer filtering units must be used to prevent clogging of these carburetors. It has been found that a large proportion of the deposit on fuel strainers consists of iron and steel particles such as welding splatter which blocks the filtering surface and reduces the capacity and efficiency of the filter. In order to prevent the iron and steel particles in the fuel supply system from becoming imbedded in the filter surface, a magnet is positioned within the filter unit to collect these particles before they are deposited on the filter surface. In annular filter units where the unfiltered fluid contacts both the inner and the outer annular surface, a magnet bottom on the filter ring provides a very efficient magnetic separator.

A primary object of the invention is to provide in an annular filter unit, a combination retainer ring and magnetic separator ring.

Another object of the invention is to provide in an annular filter element having unfiltered fluid contacting both outside walls and having fluid outlet passages through said annular unit, an annular bottom plate to seal the unit and provide a magnetic separator ring.

These and other objects of the invention will be more fully understood in connection with the following drawing and description of a preferred embodiment of the invention.

Figure 1:
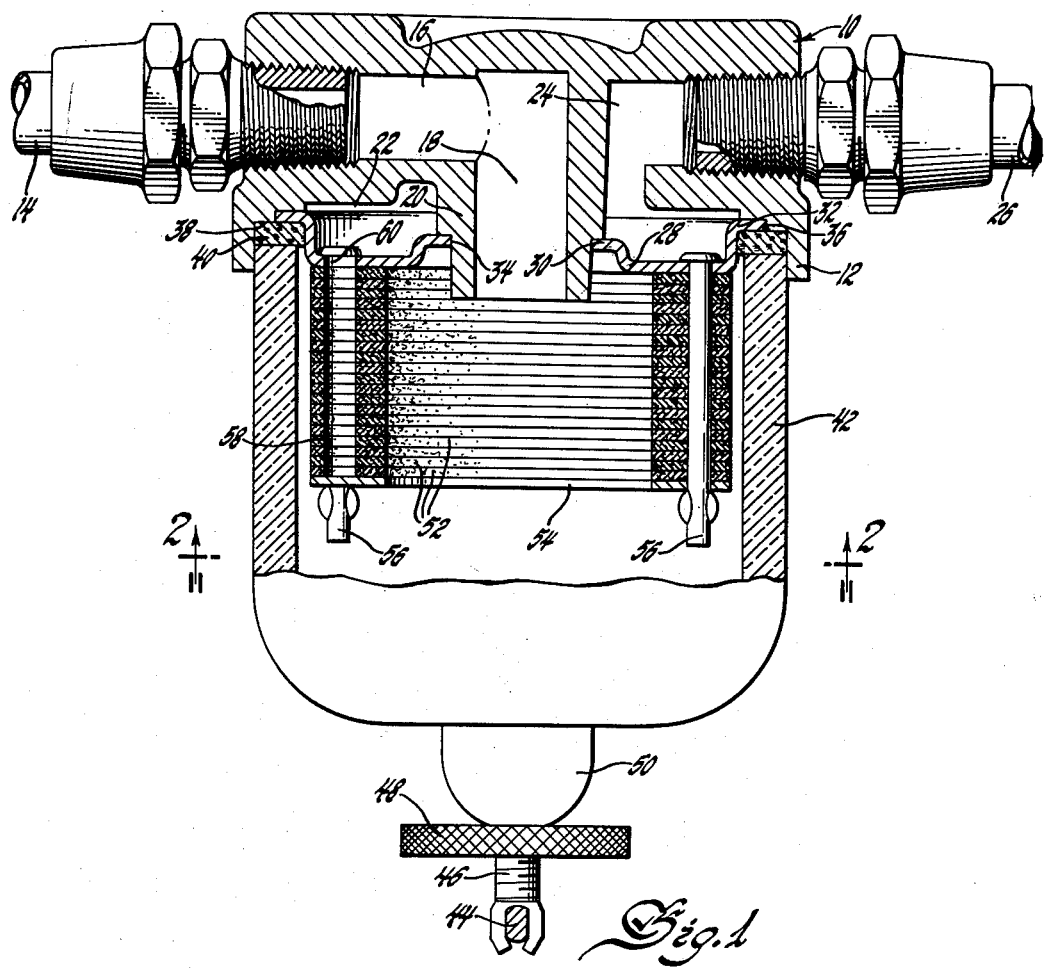
Figure 1 is an elevation of a fuel strainer with parts in section to show the details.

The invention is illustrated in a conventional automotive type fuel strainer or filter. The filter housing 10 consists of a head portion 12 having a generally cylindrical shape. An inlet pipe 14 is suitably connected by a threaded fitting to the inlet passage 16 extending radially into the strainer head 12. At the center of the filter the inlet passage 16 connects with an axial passage 18 extending vertically downward and opening into the filter chamber. A tube 20 generally formed integrally with the housing extends the filter inlet somewhat beyond the main head portion of the filter housing. An annular filtered fluid outlet recess 22 is provided surrounding the inlet passage tube 20. The annular outlet recess 22 is connected at one side to the outlet passage 24 which receives a threaded fitting of the outlet pipe 26.

The filter assembly is mounted on an annular plate 28 which has an upwardly offset internal flange 30 and an upwardly offset external flange 32. Thus the substantially U-shaped annular plate 28 forms an enlargment of the outlet recess 22. The inner flange 30 of the filter plate 28 seats on an annular shoulder 34 formed in the center tube 20. The external flange 32 fits in an annular seat 36 formed in the filter head 12 just beyond the annular recess 22. The gasket recess 38 is also formed in the head 12 just beyond the recess 36 so that a gasket 40 may seat in a flat manner against the outer flange 32 of the plate and the head 12. The lower portion of the strainer housing 10 is closed by a cup member 42 generally made of glass, which fits within the recess 38 and seats against the gasket 40. The filter housing cup 42 is secured in place by a bail 44 which is pivotally mounted on each side of the strainer head 12 in the conventional manner. The screw 46 and thumb nut 48 are employed to force the abutment member 50 into contact with the strainer cup 42 to clamp the cup against the gasket 40 and the head 12.

Figure 2:
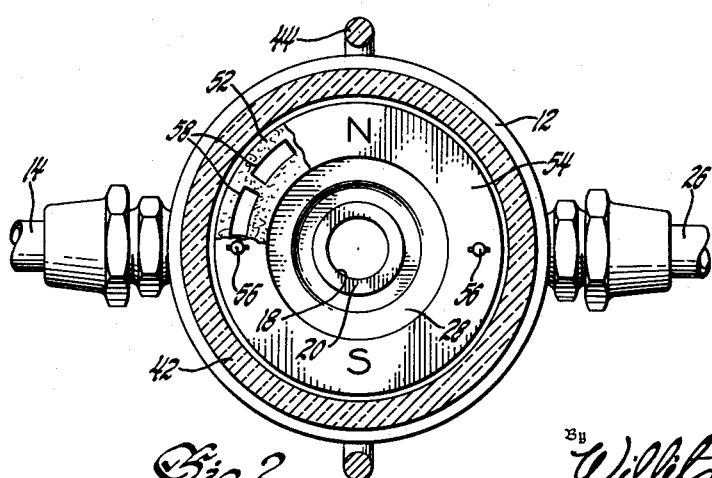
Figure 2 is a sectional view of Figure 1 on the line 2—2.

The filter element consisting of a plurality of annular rings 52 and a backing plate 54 is mounted on the plate 28. The rings are held in alignment and clamped together by the backing plate 54 and the rivets 56. Each of the filter rings 52 has a plurality of aligned apertures 58 which form an outlet passage. The backing plate is solid and also seals the lower end of the filter unit. These outlet passages 58 are in alignment with the outlet opening 60 on the mounting plate 28. In order to separate magnetic particles such as iron and steel from the fluid being filtered, the backing plate 54 is magnetized with a north at one side and a south at the other side as shown in Figure 2. The backing ring 54 may also be magnetized so that the inner edge would have one polarity and the outer edge would have another polarity.

During the normal operation of the engine fuel system, the fluid from a suitable source is drawn through the pipe 14 and enters through the central passage 16 to the center of the housing 12. There the fluid passes through the passage 18 and into the strainer bowl or cup 42. Due to the velocity of the fluid entering the cup, the fluid will flow in a stream within the fluid mass to a point approximately in the center of the cup 42, and thus will be in close proximity to the magnetic separator or backing plate element 54. Thus before the fluid passes to the filtering surface it must pass by the magnetic separator where magnetic particles will be removed. It is also pointed out that since this magnetic element is below the filtering element, that should any magnetic particles be dislodged from the magnet, they will fall to the bottom of the filter bowl 42 and are not likely to be deposited upon the surface of the strainer element. Thus the filtered fluid is cleared of magnetic particles which would clog the surface of the filter and reduce the capacity and efficiency of the filter. The fluid then flows to the inner and outer surface of the annular filter element. If the element is an edge type filter, the fluid will flow between the filter rings 52 to the outlet passages 58. If the element is a depth type filter, the fluid will flow through the rings to the outlet passages. From the outlet passages 58, the fluid will flow upwardly through the outlets 60 to the recess 22 which in turn connects to the outlet 24 and to the outlet pipe 26.

The preferred embodiment of the invention is illustrated in the above specification and drawings. It will be apparent that many modifications may be made within the scope of the invention as defined by the appended claims.

I claim:

1. In a combination filter and magnetic separator, a housing, a head portion for said housing, an inlet tube in said head portion extending beyond said head portion into said housing, said head portion having an annular outlet recess surrounding said tube, an annular plate secured in said housing adjacent said outlet recess and sealed to said head portion around said tube, an annular filter element adjacent said plate in substantial concentricity to said tube and having drainage passages for the filtered fluid, said plate having apertures connecting said passages with said outlet recess, an annular magnetic backing member secured to the base of said filter element and spaced from the bottom of said housing to remove magnetizable particles from the unfiltered fluid inflow and means including said magnetic member for clamping said filter element to said plate.

2. A combination filter and magnetic separator as defined by claim 1 wherein said annular filament element comprises a plurality of annular filter discs.

References Cited in the file of this patent

UNITED STATES PATENTS

| | | |
|---|---|---|
| 1,647,799 | Hammer | Nov. 1, 1927 |
| 1,999,913 | Merritt | Apr. 30, 1935 |
| 2,063,742 | Holmes | Dec. 8, 1936 |
| 2,117,361 | Rohrbach | May 17, 1938 |
| 2,392,624 | Tunis | Jan. 8, 1946 |
| 2,437,221 | Cox et al. | Mar. 2, 1948 |
| 2,490,635 | Kisch | Dec. 6, 1949 |
| 2,508,666 | Frantz | May 23, 1950 |
| 2,521,060 | Halliman | Sept. 5, 1950 |
| 2,680,519 | Rundquist et al. | June 8, 1954 |

FOREIGN PATENTS

| | | |
|---|---|---|
| 272,784 | Great Britain | June 23, 1927 |
| 523,919 | Great Britain | July 25, 1940 |